United States Patent [19]
Vargo

[11] Patent Number: 5,855,406
[45] Date of Patent: Jan. 5, 1999

[54] STORAGE AND DEPLOYMENT SYSTEM FOR AUTOMOBILE COVERS

[76] Inventor: Eric A. Vargo, 216 McKeough St., Saraland, Ala. 36571

[21] Appl. No.: 847,457
[22] Filed: Apr. 24, 1997
[51] Int. Cl.[6] ...................................................... B60J 11/00
[52] U.S. Cl. .............................. 296/136; 296/98; 150/166
[58] Field of Search ........................... 296/136, 98, 95.1; 150/166, 168; 160/370.21, 370.22, 370.23

[56] References Cited

U.S. PATENT DOCUMENTS

| | | | |
|---|---|---|---|
| 4,834,446 | 5/1989 | Tung-Chow | 296/136 |
| 4,856,842 | 8/1989 | Ross et al. | 296/136 |
| 5,022,700 | 6/1991 | Fusiska et al. | 276/98 |
| 5,078,330 | 1/1992 | Hall | 242/86.52 |
| 5,294,167 | 3/1994 | Yu | 296/98 |

*Primary Examiner*—Joseph D. Pape
*Attorney, Agent, or Firm*—Joseph N. Breaux

[57] ABSTRACT

A storage and deployment system for automobile covers that includes a car cover rewind mechanism housing having a cover storage compartment accessible through a cover deployment and retraction opening defined by a beveled opening defining member; a spring biased rewind mechanism positioned within the cover storage compartment of the rewind mechanism housing; at least one rewind strap assemblies each including a strap attachment mechanism having female strap attachment component provided with a strap attachment aperture and two cover securing apertures and a male strap attachment component provided with two resilient rubber, securing aperture insertable, securing insert structures; two housing attachment fittings each having a clip receiving orifice, each housing attachment fitting being provided on the exterior of the rewind mechanism housing; two trunk floor attachment clips each having a clip end insertable into one of the clip receiving orifices of the housing attachment fitting; a user graspable handle with magnetic retraction opening cover; and at least one deployment strap assemblies each including a strap attachment mechanism having female strap attachment component provided with a strap attachment aperture and two cover securing apertures and a male strap attachment component provided with two resilient rubber, securing aperture insertable, securing insert structures.

20 Claims, 3 Drawing Sheets

STORAGE AND DEPLOYMENT SYSTEM FOR AUTOMOBILE COVERS

TECHNICAL FIELD

The present invention relates to devices for storing vehicle covers and more particularly to a storage and deployment system for automobile covers that includes a car cover rewind mechanism housing having a cover storage compartment accessible through a cover deployment and retraction opening defined by a beveled opening defining member; a spring biased rewind mechanism positioned within the cover storage compartment of the rewind mechanism housing; at least one rewind strap assemblies each including a strap attachment mechanism having female strap attachment component provided with a strap attachment aperture and two cover securing apertures and a male strap attachment component provided with two resilient rubber, securing aperture insertable, securing insert structures; two housing attachment fittings each having a clip receiving orifice, each housing attachment fitting being provided on the exterior of the rewind mechanism housing; two trunk floor attachment clips each having a clip end insertable into one of the clip receiving orifices of the housing attachment fitting; a user graspable handle with magnetic retraction opening cover; and at least one deployment strap assemblies each including a strap attachment mechanism having female strap attachment component provided with a strap attachment aperture and two cover securing apertures and a male strap attachment component provided with two resilient rubber, securing aperture insertable, securing insert structures.

BACKGROUND OF THE INVENTION

Many vehicles must be parked outside at one time or another. When outside parking is required many vehicle owners would like to cover the vehicle to protect the vehicle finish from the weather, falling leaves and sticks, and other hazards such a small animals. Although many of these vehicle owner's would like to cover the vehicle each time the vehicle is left outside, the work required to install and remove a vehicle cover is too great to make this a practical solution. It would be a benefit, therefore, to have a a storage and deployment system for vehicle covers that reduces the amount of time and effort required to install and remove a vehicle cover. Because many makes and models of vehicles have covers especially designated to snugly cover the vehicle that are readily available, it would be a further benefit to have a storage and deployment system for vehicles that could be used with a large number of readily available vehicle covers. In addition, because covers can become damaged through use or soiled with bird dropping etc., it would be further desirable to have a storage and deployment system for vehicles covers that allowed a user to readily detach the cover from the deployment system for replacement or laundering.

SUMMARY OF THE INVENTION

It is thus an object of the invention to provide a storage and deployment system for automobile covers.

It is a further object of the invention to provide a storage and deployment system for automobile covers that reduces the amount of time and effort required to install and remove a vehicle cover.

It is a still further object of the invention to provide a storage and deployment system for automobile covers that can be go used with a large number of readily available vehicle covers.

It is a still further object of the invention to provide a storage and deployment system for automobile covers that can be readily detached from a vehicle cover to allow for replacement or laundering of the vehicle cover.

It is a still further object of the invention to provide a storage and deployment system for automobile covers that includes a car cover rewind mechanism housing having a cover storage compartment accessible through a cover deployment and retraction opening defined by a beveled opening defining member; a spring biased rewind mechanism positioned within the cover storage compartment of the rewind mechanism housing; at least one rewind strap assemblies each including a strap attachment mechanism having female strap attachment component provided with a strap attachment aperture and two cover securing apertures and a male strap attachment component provided with two resilient rubber, securing aperture insertable, securing insert structures; two housing attachment fittings each having a clip receiving orifice, each housing attachment fitting being provided on the exterior of the rewind mechanism housing; two trunk floor attachment clips each having a clip end insertable into one of the clip receiving orifices of the housing attachment fitting; a user graspable handle with magnetic retraction opening cover; and at least one deployment strap assemblies each including a strap attachment mechanism having female strap attachment component provided with a strap attachment aperture and two cover securing apertures and a male strap attachment component provided with two resilient rubber, securing aperture insertable, securing insert structures.

It is a still further object of the invention to provide a storage and deployment system for automobile covers that accomplishes some or all of the above objects in combination.

Accordingly, a storage and deployment system for automobile covers is provided. The storage and deployment system comprises a car cover rewind mechanism housing having a cover storage compartment accessible through a cover deployment and retraction opening defined by a beveled opening defining member; a spring biased rewind mechanism positioned within the cover storage compartment of the rewind mechanism housing; at least one rewind strap assembly each including a strap attachment mechanism having female strap attachment component provided with a strap attachment aperture and two cover securing apertures and a male strap attachment component provided with two resilient rubber, securing aperture insertable, securing insert structures; two housing attachment fittings each having a clip receiving orifice, each housing attachment fitting being provided on the exterior of the rewind mechanism housing; two trunk floor attachment clips each having a clip end insertable into one of the clip receiving orifices of the housing attachment fitting; a user graspable handle with magnetic retraction opening cover; and at least one deployment strap assembly each including a strap attachment mechanism having female strap attachment component provided with a strap attachment aperture and two cover securing apertures and a male strap attachment component provided with two resilient rubber, securing aperture insertable, securing insert structures.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
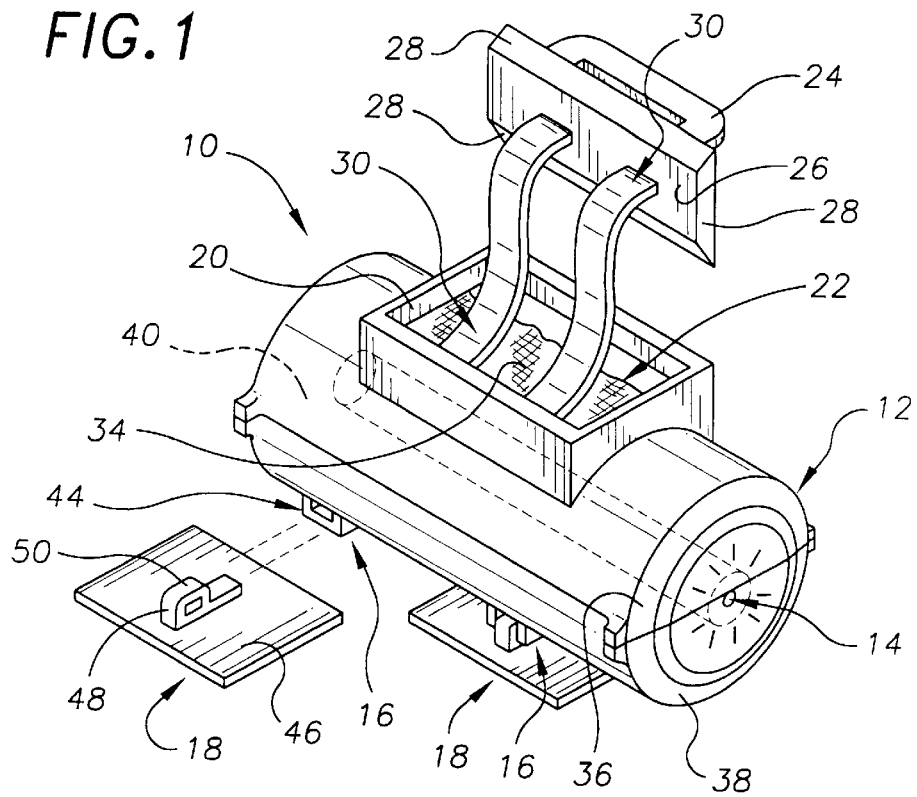
FIG. 1 is a perspective view of an exemplary embodiment of the storage and deployment system for automobile covers of the present invention showing the car cover rewind mechanism housing; the spring biased rewind mechanism; the housing attachment fittings; the two trunk floor attachment clips; the beveled cover deployment and retraction opening; the user graspable handle with magnetic retraction opening cover; and the two deployment straps.
Figure 2:
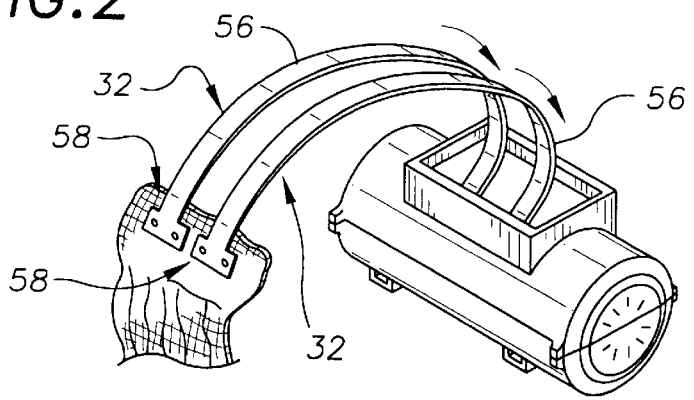
FIG. 2 is a perspective view of the exemplary embodiment of the storage and deployment system for automobile covers of FIG. 1 showing a representative conventional car cover secured between the strap attachment mechanisms of the deployment straps and the identical strap attachment mechanisms of the rewind straps.
Figure 2:
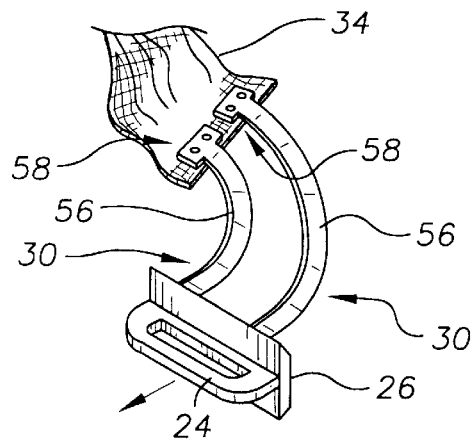

FIG. 1 shows an exemplary embodiment of the storage and deployment system for automobile covers of the present invention generally designated by the numeral 10. Storage and deployment system 10 includes a cover rewind mechanism housing, generally designated by the numeral 12; a spring biased rewind mechanism housed within rewind mechanism housing 14; two housing attachment fittings, generally designated 16; two trunk floor attachment clips, generally designated 18; a beveled opening defining member, 20, that defines a cover deployment and retraction opening 22; a user graspable handle 24 with a magnetic retraction opening cover 26 having four beveled edges 28 (only 3 shown); two deployment strap assemblies, generally designated 30; and two rewind strap assemblies, generally designated 32 (FIG. 2). In use a conventional car cover 34 (also shown in FIG. 2) for the desired make and model is attached between the two deployment strap assemblies 30 and the two rewind strap assemblies 32 (FIG. 2).

Cover rewind mechanism housing 12, housing attachment fittings 16, trunk floor attachment clips 18, and handle 24 are molded of ABS plastic. Cover rewind mechanism housing 12 includes an upper housing member 36 and a lower housing member 38 that are attached together with screws to form a cylindrically shaped cover storage compartment 40 that is accessible through cover deployment and retraction opening 22. Beveled opening defining member 20 is integrally formed with upper housing member 36 and defines a substantially rectangular cover deployment and retraction opening 22. Magnetic retraction opening cover 26 is constructed of rubberized magnetic material and is sized and has beveled edges 28 positioned in a manner to seat within opening defining member 20 and seal cover deployment and retraction opening 22. Housing attachment fittings 16 each include a clip receiving orifice 44 having a rectangular cross sectional area and are each integrally formed on the exterior of lower housing member 38.

Trunk floor attachment clips 18 each include a mounting plate 46 that is securable to a trunk floor with screws, adhesives or other suitable and well known attachment mechanism and an attachment clip 48 integrally formed with mounting plate 46 and having a clip end 50 that is insertable into and lockable within the clip receiving orifices 44 of housing attachment fittings 16.

Spring biased rewind mechanism 14 is a conventional window shade type rewind mechanism that is mounted within rewind mechanism housing 14. With reference now to FIG. 2, rewind mechanism 14 includes a rewind reel to which the two rewind strap assemblies 32 are attached. Each rewind strap assembly 32 and deployment strap assembly 30 includes a length of nylon strapping material 56 and a strap attachment mechanism 58. One end of the length of strapping material 56 of each of the rewind satrap assemblies 32 is secured to the rewind reel. The other end is secured to a strap attachment mechanism 58. In a like fashion, one end of the length of strapping material 56 of each of the deployment strap assemblies 30 is positioned through magnetic retraction opening cover 26 and secured to handle 24 and the other end is secured to a strap attachment mechanism 58.

Figure 3:
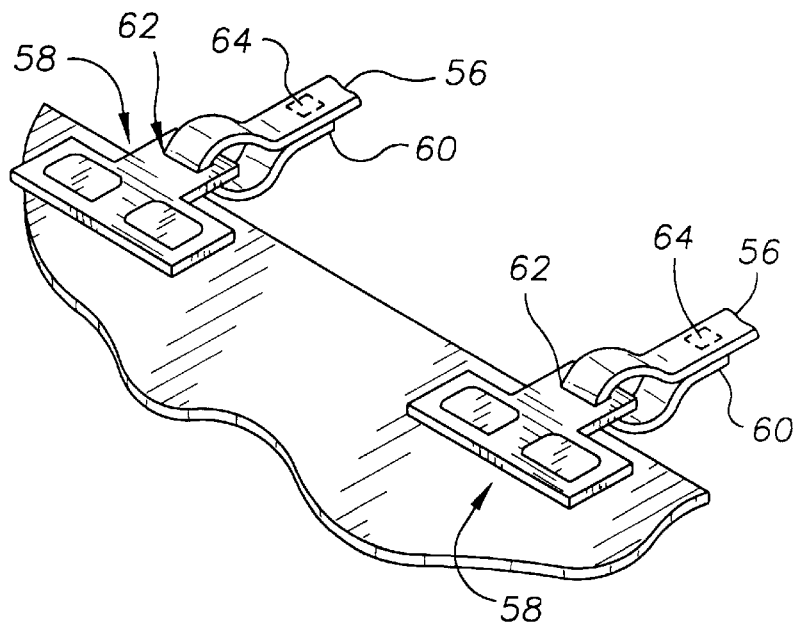
FIG. 3 is a detail perspective view of two of the four identical strap attachment mechanism attached along an edge portion of the conventional car cover of FIG. 2.
Figure 3A:
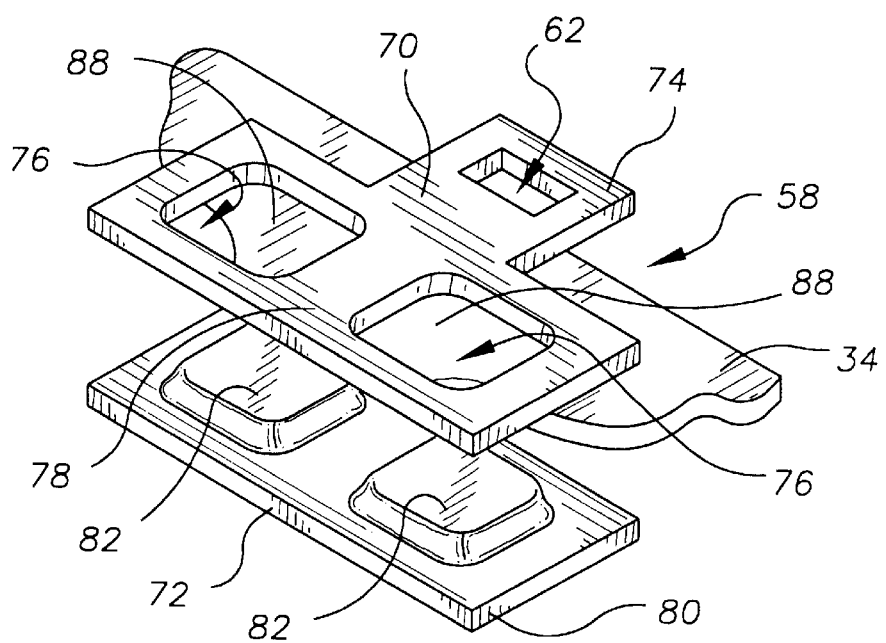
FIG. 3A is a detail, partially exploded view of one of the four identical strap attachment mechanisms showing the female strap attachment component with its strap attachment aperture and two cover securing apertures; the male strap attachment component with its two resilient rubber, securing aperture insertable, securing insert structures; and a representative section of the nylon fabric of the convention car cover.

With reference to FIG. 3, as each of the strap attachment mechanisms 58 are identical, the following discussion is and is intended to be equally applicable to all strap attachment mechanisms 58. The other ends 60 of the lengths of strapping material 56 are each secured to a strap attachment mechanism 58 by threading the other end 60 through a strap attachment aperture 62 (also shown in FIG. 3A) and then securing it in place with stitches 64. Referring now to FIG. 3A, each strap attachment mechanism 58 includes a female strap attachment component 70 and a male strap attachment component 72. In this embodiment, female strap attachment component 70 is substantially T-shaped and has strap attachment aperture 62 formed through one tab 74 and two identically sized and shaped cover securing apertures 76 formed through a second tab 78. Male strap attachment component 72 has a substantially rectangular, rigid base plate 80 upon which are secured two identical, securing aperture insertable, securing insert structures 82 constructed from resilient rubber. Securing insert structures 82 are sized and shaped in a manner such that each insert structure can be compressed to a size sufficient to allow insertion of at least a portion thereof into a cover securing aperture 76 thereof and sufficiently resilient to resiliently expand and become lodged within the cover securing aperture 76. In use, a section 88 of car cover 34 is placed over securing insert structures 82 prior to inserting them into cover securing apertures 76 to secure car cover 34 to storage and deployment system 10.

Figure 4:
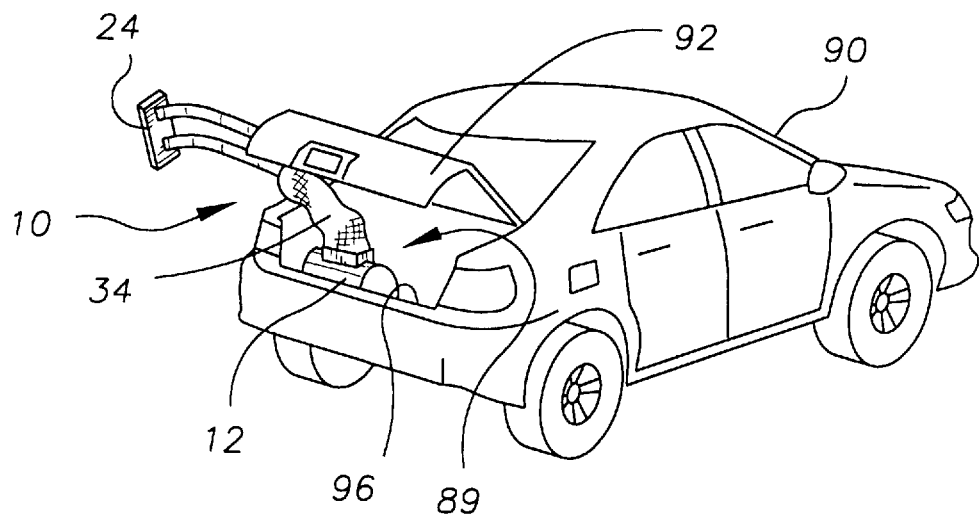
FIG. 4 is a perspective view of the exemplary storage and deployment system for automobile covers of FIG. 1 installed within the trunk of a representative automobile showing the edge of the trunk opening, the trunk lid partially opened, and the car cover partially deployed from the car cover rewind mechanism housing.
Figure 5:
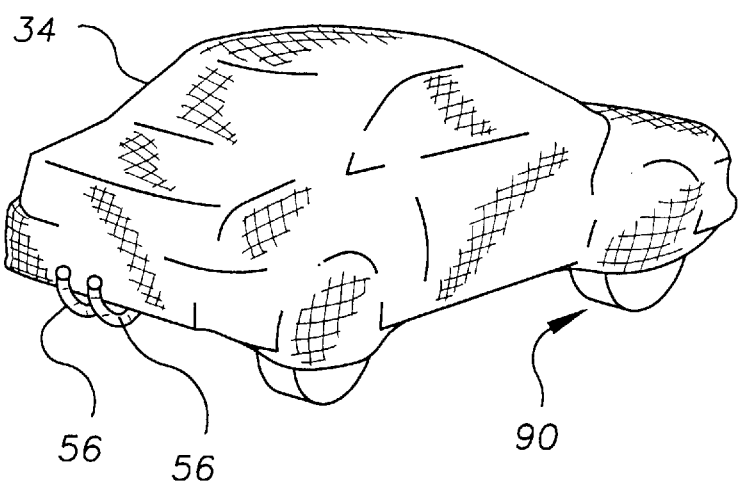
FIG. 5 is a perspective view of the representative automobile of FIG. 4 with the trunk lid closed and locked; the car cover positioned over and covering the exterior of the car; and the rewind straps positioned between the trunk lid and the edge of the trunk opening.

Referring now to FIG. 4, storage and deployment system 10 is installed within the trunk compartment 89 of a representative automobile 90 by screwing or otherwise securing trunk floor attachment clips 18 (FIG. 2) to the floor of trunk compartment 89 and then attaching cover rewind mechanism housing 12 to trunk attachment clips 18 as previously described. When it is desired to deploy car cover 34, the user opens trunk lid 92, grasps handle 24 and pulls to fully remove car cover 34 from rewind reel 14 (FIG. 1). Referring now to FIG. 5, a section of each length of strapping material 56 from rewind strap assemblies 32 is then positioned against the edge 96 (FIG. 4) of the trunk opening and then trunk lid 92 is closed and locked in the conventional fashion. Once trunk lid 92 is closed and locked, car cover 34 is placed over car 90 and magnetic retraction opening cover 26 (FIG. 1) is stored out of the way by placing it against any readily available steel surface under the front of car 90. Retraction and storage of cover 34 is accomplished by removing car cover 34, opening trunk lid 92 and tugging to activate rewind mechanism 14.

It can be seen from the preceding description that a storage and deployment system for automobile covers has been provided that reduces the amount of time and effort required to install and remove a vehicle cover; that can be used with a large number of readily available vehicle covers; that can be readily detached from a vehicle cover to allow for replacement or laundering of the vehicle cover; and that includes a car cover rewind mechanism housing having a cover storage compartment accessible through a cover deployment and retraction opening defined by a beveled opening defining member; a spring biased rewind mechanism positioned within the cover storage compartment of the rewind mechanism housing; at least one rewind strap assemblies each including a strap attachment mechanism having female strap attachment component provided with a strap attachment aperture and two cover securing apertures and a male strap attachment component provided with two resilient rubber, securing aperture insertable, securing insert structures; two housing attachment fittings each having a clip receiving orifice, each housing attachment fitting being provided on the exterior of the rewind mechanism housing; two trunk floor attachment clips each having a clip end insertable into one of the clip receiving orifices of the housing attachment fitting; a user graspable handle with magnetic retraction opening cover; and at least one deployment strap assemblies each including a strap attachment mechanism having female strap attachment component provided with a strap attachment aperture and two cover securing apertures and a male strap attachment component provided with two resilient rubber, securing aperture insertable, securing insert structures.

It is noted that the embodiment of the storage and deployment system for automobile covers described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A storage and deployment system for automobile covers comprising:

a car cover rewind mechanism housing having a cover storage compartment that is accessible through an automobile cover deployment and retraction opening defined by an opening defining member;

a spring biased rewind mechanism positioned within said cover storage compartment of said rewind mechanism housing;

at least one rewind strap assembly each including a length of strapping material having one end thereof secured to said rewind mechanism and a second end secured to a strap attachment mechanism having a female strap attachment component provided with two cover securing apertures and a male strap attachment component provided with two resilient, securing aperture insertable, securing insert structures;

two housing attachment fittings each having a clip receiving orifice, each housing attachment fitting being provided on an exterior surface of said rewind mechanism housing;

two trunk floor attachment clips each having a clip end insertable into one of said clip receiving orifices of said housing attachment fittings;

a user graspable handle with an automobile deployment and retraction opening cover member; and at least one deployment strap assembly each including a length of strapping material having one end secured to said user graspable handle and a second end secured to a strap attachment mechanism having a female strap attachment component provided with a strap attachment aperture and two cover securing apertures and a male strap attachment component provided with two resilient, securing aperture insertable, securing insert structures.

2. The storage and deployment system for automobile covers of claim 1, wherein:

said automobile deployment and retraction opening cover is constructed from a magnetic material.

3. The storage and deployment system for automobile covers of claim 1, wherein:

said opening defining member has beveled edges; and said automobile deployment and retraction opening cover is sized and has beveled edges positioned in a manner to seat within said opening defining member and seal said cover deployment and retraction opening.

4. The storage and deployment system for automobile covers of claim 1 wherein:

said cover rewind mechanism housing includes an upper housing member and a lower housing member that are attached together to form a cylindrically shaped cover storage compartment that is accessible through said automobile cover deployment and retraction opening.

5. The storage and deployment system for automobile covers of claim 4 wherein:

said opening defining member is integrally formed with said upper housing member and defines a substantially rectangular automobile cover deployment and retraction opening.

6. The storage and deployment system for automobile covers of claim 4 wherein:

said housing attachment fittings are each integrally formed on an exterior surface of said lower housing member.

7. The storage and deployment system for automobile covers of claim 5 wherein:

said housing attachment fittings are each integrally formed on an exterior surface of said lower housing member.

8. The storage and deployment system for automobile covers of claim 2, wherein:

said opening defining member has beveled edges; and said automobile deployment and retraction opening cover is sized and has beveled edges positioned in a manner to seat within said opening defining member and seal said cover deployment and retraction opening.

9. The storage and deployment system for automobile covers of claim 2 wherein:

said cover rewind mechanism housing includes an upper housing member and a lower housing member that are attached together to form a cylindrically shaped cover storage compartment that is accessible through said automobile cover deployment and retraction opening.

10. The storage and deployment system for automobile covers of claim 9 wherein:

said opening defining member is integrally formed with said upper housing member and defines a substantially rectangular automobile cover deployment and retraction opening.

11. The storage and deployment system for automobile covers of claim 9 wherein:

said housing attachment fittings are each integrally formed on an exterior surface of said lower housing member.

12. The storage and deployment system for automobile covers of claim 10 wherein:

said housing attachment fittings are each integrally formed on an exterior surface of said lower housing member.

13. The storage and deployment system for automobile covers of claim 8 wherein:

said cover rewind mechanism housing includes an upper housing member and a lower housing member that are attached together to form a cylindrically shaped cover storage compartment that is accessible through said automobile cover deployment and retraction opening.

14. The storage and deployment system for automobile covers of claim 13 wherein:

said opening defining member is integrally formed with said upper housing member and defines a substantially rectangular automobile cover deployment and retraction opening.

15. The storage and deployment system for automobile covers of claim 13 wherein:

said housing attachment fittings are each integrally formed on an exterior surface of said lower housing member.

16. The storage and deployment system for automobile covers of claim 14 wherein:

said housing attachment fittings are each integrally formed on an exterior surface of said lower housing member.

17. The storage and deployment system for automobile covers of claim 3 wherein:

said cover rewind mechanism housing includes an upper housing member and a lower housing member that are attached together to form a cylindrically shaped cover storage compartment that is accessible through said automobile cover deployment and retraction opening.

18. The storage and deployment system for automobile covers of claim 17 wherein:

said opening defining member is integrally formed with said upper housing member and defines a substantially rectangular automobile cover deployment and retraction opening.

19. The storage and deployment system for automobile covers of claim 17 wherein:

said housing attachment fittings are each integrally formed on an exterior surface of said lower housing member.

20. The storage and deployment system for automobile covers of claim 18 wherein:

said housing attachment fittings are each integrally formed on an exterior surface of said lower housing member.

* * * * *